United States Patent
Siegel (10) Patent No.: US 10,733,363 B1
(45) Date of Patent: Aug. 4, 2020

(54) EDITION DIFFERENCE VISUALIZATION (71) Applicant: IMDb.com, Inc., Seattle, WA (US)

(72) Inventor: Hilliard Bruce Siegel, Seattle, WA (US)

(73) Assignee: IMDB.COM, INC., Seattle, WA (US)

( * ) Notice: Subject to any disclaimer, the term of this patent is extended or adjusted under 35 U.S.C. 154(b) by 220 days.

(21) Appl. No.: 14/887,767

(22) Filed: Oct. 20, 2015

(51) Int. Cl.
G06F 17/20 (2006.01)
G06F 40/169 (2020.01)
G06F 40/103 (2020.01)
G06F 40/197 (2020.01)

(52) U.S. Cl.
CPC .......... *G06F 40/169* (2020.01); *G06F 40/103* (2020.01); *G06F 40/197* (2020.01)

(58) Field of Classification Search
CPC .. G06F 17/241; G06F 17/211; G06F 17/2288; G06F 17/2211; G06F 40/103; G06F 40/169; G06F 40/197
USPC .......................................................... 715/229
See application file for complete search history.

(56) References Cited

U.S. PATENT DOCUMENTS

| | | | | |
|---|---|---|---|---|
| 7,421,429 B2* | 9/2008 | Thota | ................ | G06F 17/30864 |
| 8,121,989 B1* | 2/2012 | Gengelbach | ........ | G06F 17/2211 |
| | | | | 707/695 |
| 8,260,915 B1* | 9/2012 | Ashear | .................... | G06F 13/00 |
| | | | | 709/224 |
| 8,316,292 B1* | 11/2012 | Verstak | ............. | G06F 17/30722 |
| | | | | 715/229 |
| 8,412,718 B1* | 4/2013 | Bilger | ................ | G06Q 30/0631 |
| | | | | 707/758 |
| 8,874,731 B1* | 10/2014 | Puppin | .............. | G06F 17/30867 |
| | | | | 707/736 |
| 9,053,079 B2* | 6/2015 | Bailor | ...................... | G06F 17/24 |
| 9,477,703 B1* | 10/2016 | Criss | ................... | G06F 17/2211 |
| 9,514,103 B2* | 12/2016 | Kletter | ................ | G06F 17/2211 |
| 2010/0318892 A1* | 12/2010 | Teevan | ................ | G06F 17/3089 |
| | | | | 715/229 |

(Continued)

OTHER PUBLICATIONS

FedEx, "FedEx Return Solutions—Return Label Options", obtained via Internet Archive Wayback Machine as published by FedEx on Jan. 6, 2013 at http://web.archive.org/web/20130106045541/http://www.fedex.com/us/return-solutions/return-label-options/, p. 1.*

(Continued)

*Primary Examiner* — Keith D Bloomquist
(74) *Attorney, Agent, or Firm* — Hogan Lovells US LLP (57) ABSTRACT

Differences between editions of items, such as books, can be determined and information about those difference provided for display to a user. The information can include a difference score, for example, that indicates an overall level of difference between the editions. This can include a percentage difference in some embodiments, considering the overall differences or differences for portions considered to be significant. In other embodiments contextual information, weightings, and other factors can be used to attempt to generate a similarity (or difference) score that will be of more use to a potential consumer, where the consumer can determine the substantive differences between the versions and determine whether the difference in price justifies the extent of the differences. The consumer in some embodiments can also view the differences, or at least a subset or information about the differences.

17 Claims, 8 Drawing Sheets (56) References Cited

U.S. PATENT DOCUMENTS

| | | | | |
|---|---|---|---|---|
| 2012/0096094 A1* | 4/2012 | So | ............... | G06F 17/30017 709/206 |
| 2013/0212454 A1* | 8/2013 | Casey | ............... | G06Q 10/10 715/203 |
| 2013/0332319 A1* | 12/2013 | Zuber | ............... | G06Q 30/0601 705/27.1 |
| 2014/0095456 A1* | 4/2014 | Pidduck | ............... | G06F 17/30309 707/695 |
| 2014/0136497 A1* | 5/2014 | Georgiev | ............... | G06F 17/3023 707/695 |
| 2014/0278360 A1* | 9/2014 | Clark | ............... | G06F 17/241 704/9 |
| 2014/0280204 A1* | 9/2014 | Avery | ............... | G06F 17/30424 707/748 |
| 2015/0052135 A1* | 2/2015 | Calkowski | ............... | G06F 17/3023 707/737 |

OTHER PUBLICATIONS

FedEx, "Return Solutions—Return Label Options", obtained via the Internet Archive Wayback Machine as published by FedEx on Jan. 6, 2013, located at http://web.archive.org/web/20130106045541/ http://www.fedex.com/us/return-solutions/return-label-options/, p. 1.*
FedEx, "Return Solutions—Return Label Options", obtained via the Internet Archive Wayback Machine as published by FedEx on Jan. 6, 2013, located at http://web.archive.org/web/20130106045541/ http://www.fedex.com/us/return-solutions/return-label-options/.*

* cited by examiner

English Literature 3rd edition, Ch. 3

"Yes," said she, "a new English fire-engine and Pastor Bastholm's library," and those probably were all the lions in the city. A few officers of the Lancers composed the fine-gentleman world. Everybody knew what was done in everybody's house, whether a scholar was elevated or degraded in his class, and the like. A private theatre, to which, at general rehearsal, the scholars of the grammar school and the maid-servants of the town had free entrance, furnished rich material for conversation. The place was remote from woods, and still farther from the coast; but the great post-road went through the city, and the post-horn resounded from the rolling carriage.

1. What did the author mean by "the lions in the city?"

2. What does the post-horn symbolize?

3. Describe the Lancers.

English Literature 4th edition, Ch. 3

"Yes," said she, "a new English fire-engine and Pastor Bastholm's library," and those probably were all the lions in the city. A few officers of the Lancers composed the fine-gentleman world.

The author goes on to write, "Everybody knew what was done in everybody's house, whether a scholar was elevated or degraded in his class, and the like. A private theatre, to which, at general rehearsal, the scholars of the grammar school and the maid-servants of the town had free entrance, furnished rich material for conversation. The place was remote from woods, and still farther from the coast; but the great post-road went through the city, and the post-horn resounded from the rolling carriage."

1. What did the author mean by "the lions in the city?"

2. What does the post-road symbolize?

3. Why is Pastor Bastholm's library significant?

Changes between editions:

Exercises

Chapter 3:
           2. "post-horn" → "post-road"
           3. "Describe the Lancers → Why is Pastor Bastholm's library significant?
        See in book     Body Text
      Chapter 3:
        Added: "The author goes on to write,"
      See in book     Chapter heading
        3rd → 4th
      See in book

EDITION DIFFERENCE VISUALIZATION

BACKGROUND

Authors and publishers of books, and other such media, often publish or provide new versions or editions of their books. When a potential customer is attempting to purchase one of these books, the customer might have the option of purchasing the current edition or a prior edition. The cost difference between the current edition and the prior edition may be significant, such that for customers such as students with limited funds, a customer may prefer to purchase an earlier edition if the differences between the editions are relatively minor. It will often be difficult for the customer to determine the type and extent of the differences between the books, particularly if the books are electronic books, or "e-books," offered from a provider such that the customer cannot first obtain and compare the books. Customers can thus end up spending more money than desired to ensure that they have adequate content from the current version, or may end up disappointed with an earlier version when the extent of the changes is significant.

BRIEF DESCRIPTION OF THE DRAWINGS

Various embodiments in accordance with the present disclosure will be described with reference to the drawings, in which:

FIGS. 3A and 3B illustrate example displays for indicating information about differences between versions that can be generated in accordance with various embodiments.

DETAILED DESCRIPTION

Systems and methods in accordance with various embodiments of the present disclosure may overcome one or more of the aforementioned and other deficiencies experienced in conventional approaches to managing content having multiple versions or editions. In particular, various embodiments attempt to determine a quantitative and/or qualitative difference between editions and provide that difference to a potential consumer, such that the consumer can determine which version or edition to obtain. In some embodiments, the content of different editions is analyzed to determine the extent of the differences, such as a percentage of the content that is different. Some embodiments also attempt to determine qualitative differences between the editions, such as the types of differences or how much the types of differences might impact a potential use of the content. Further still, some embodiments generate a difference score that attempts to combine the quantitative and qualitative aspects to a single piece of information that a potential consumer can use to determine which edition to consume (i.e., purchase, rent, download, lease, or borrow) by considering the relative scores of the editions and the relative prices of those editions, among other such information.

Various other functions and advantages are described and suggested below as may be provided in accordance with the various embodiments.

Figure 1A:
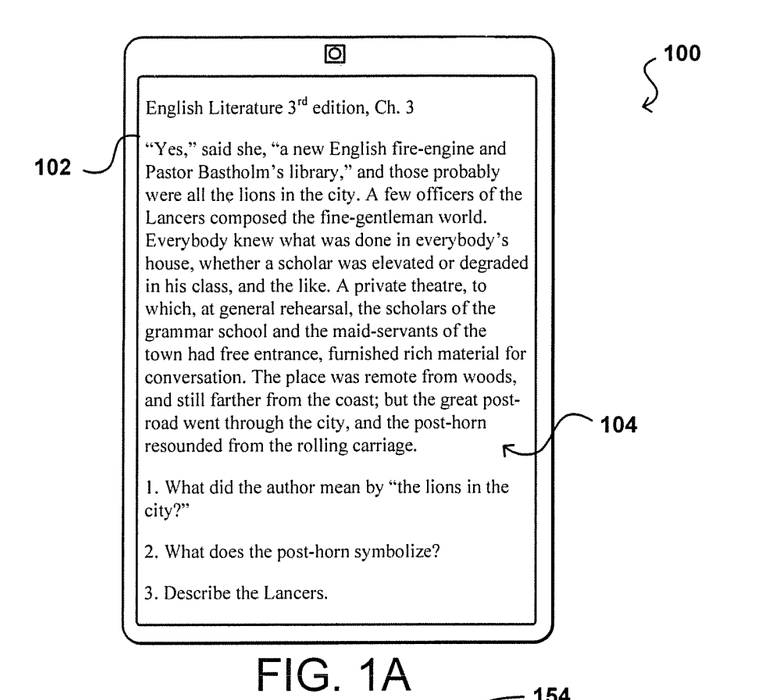
FIGS. 1A and 1B illustrate example differences in content between versions of an electronic book that can be analyzed in accordance with various embodiments.
Figure 1B:
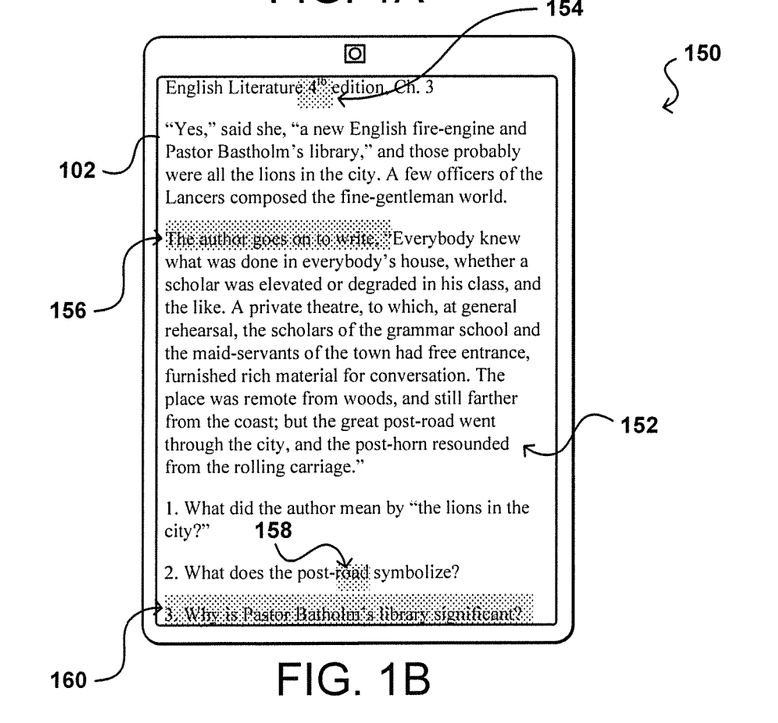

FIGS. 1A and 1B illustrate corresponding example pages of content that can be contained within different editions of the same text, in this case provided through an e-book file or other such offering. In the first example 100 of FIG. 1A, a page of text 104 is displayed on a display 102 of a computing device. The page includes information such as a page header with the name of the book and chapter of the page, body text or prose for the current page of content, and questions or exercises, such as may be included in a text book for a class or program. It should be understood that e-books differ from physical books in various ways, such as in the fact that the contents of a given page may not be fixed, but may vary based upon factors such as screen size or resolution, font size, user notations, and other such factors. Thus, when discussing "pages" of content it should be understood that the page may not be a physical or fixed subset of the content. When comparing editions of texts, such differences may be excluded in at least some embodiments in order to focus on substantive differences that may impact the value or use of the book, such as the ability of a student to use an old edition for a specific class.

The example 150 of FIG. 1B illustrates a corresponding page of a current version of the text 152. The current edition contains various differences with respect to the earlier version. For example, the title of the book in the header includes a difference 154 indicating the different edition. While this is an actual difference between the editions, it may not be considered a substantive difference that would significantly impact the usefulness of the edition. Similar differences may correspond to cover art, a foreword or introduction, publication data, critical reviews, and the like. Thus, when discussing which differences to include in various approaches herein, such differences may be excluded from the information surfaced to the potential customer. Another difference 156 resides in the prose or body text of the editions. In some embodiments a process may be utilized to attempt to determine the context of the difference in order to determine an effect of the change, while in other embodiments any changes to the body text can be considered significant and included in the difference determination. Still other differences 158, 160 relate to differences in the exercises or questions. For students that will have homework based on the questions that may be graded, it can be very important that the student either have the current exercises or understand that the student will need to obtain or verify the exercises from another student or source. Thus, changes to exercises, questions, or other such portions of a text may be considered very significant, and in some embodiments may be weighted more heavily than changes to the body text. When surfacing information about the type of changes in some embodiments, it may be extremely valuable to surface information about changes to the exercises, whether they be changes to specific names and numbers as in one example 158, whereby the student may still learn the appropriate information, or whether the question is an entirely new question as in the other example 160.

Figure 2A:
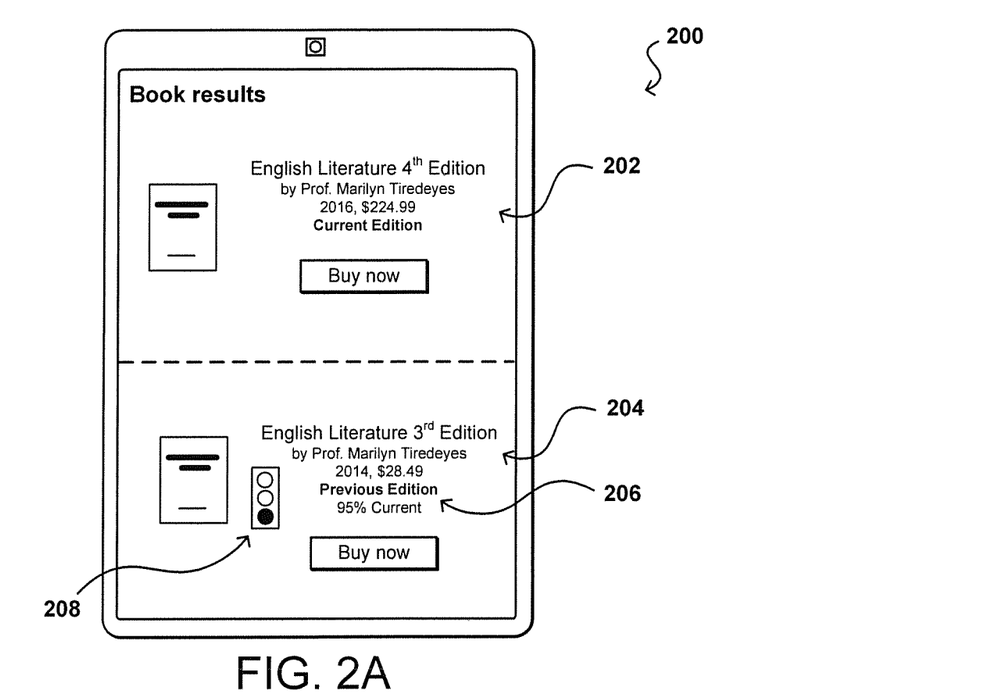
FIGS. 2A and 2B illustrate example displays for indicating information about differences between versions that can be generated in accordance with various embodiments.

Upon determining difference information as discussed herein, a provider of an electronic marketplace or other such source of content can provide at least some of the difference information, or a summary of the difference information, to a potential customer interested in at least one of the editions. It should be understood that similarity information, as opposed to difference information, can be used as well within the scope of the various embodiments, as the similarity data will generally be complementary to the difference data and can be determined using similar algorithms or processes, etc. Further, although books are used as examples herein, it should be understood that various other types of content or items with different editions or versions can utilize advantages of the various embodiments as well, such as may be useful for audio books, movies or other video files, music or other audio files, video games, and the like. For example, the example 200 of FIG. 2 illustrates an example page of content, such as a search result page or comparison page, where a potential consumer can view information about two or more editions of a book. In this example, information 202 for a current edition of the book is displayed, where the information includes information such as the title and author of the book, publication date, and price, among other such information. The information also indicates that the edition is the current edition, such that the potential consumer can understand that if the consumer is worried about changes to the book, or otherwise just wants the most up-to-date copy, the consumer might want to purchase this edition independent of whether the current edition is significantly more expensive than a prior edition.

Also displayed is information 204 for a previous edition of the book. This information again includes basic information such as title, author, publication date, and price. Along with the basic information is information 206 about the edition of the book and the differences from the current edition. In this example, the information 206 indicates that the book is a prior edition, and that the content of the book is 95% current with the current edition. This number can be determined in a number of different ways as discussed and suggested herein. The presentation also includes a graphical element 208 that can provide some level of safety or recommendation to the consumer about whether or not to purchase that edition. For example, in this case where the edition is 95% current the icon might be green, indicating that it is likely safe to purchase this edition. The information used to make such determination can include contextual and other information in addition to the percentage difference in at least some embodiments. This example might cause the icon to be displayed with a yellow light if the differences are in a certain range, such as between 80% and 90% current, or can be displayed with a red light if the book is less than 80% current. These numbers can be set by any appropriate entity, such as the provider of the electronic marketplace, a book provider, a user, etc. Further, the numbers or thresholds might vary based upon user feedback, type of content, types of differences, or other such information. For example, if books with a difference of 80-85% have a higher than average return frequency, then the threshold for a red light might be adjusted to correspond to content with more than an 85% difference. In some embodiments the differences in price might be considered with the difference in content to provide a value determination as to whether the consumer would be better off buying the current edition, etc.

Figure 2B:
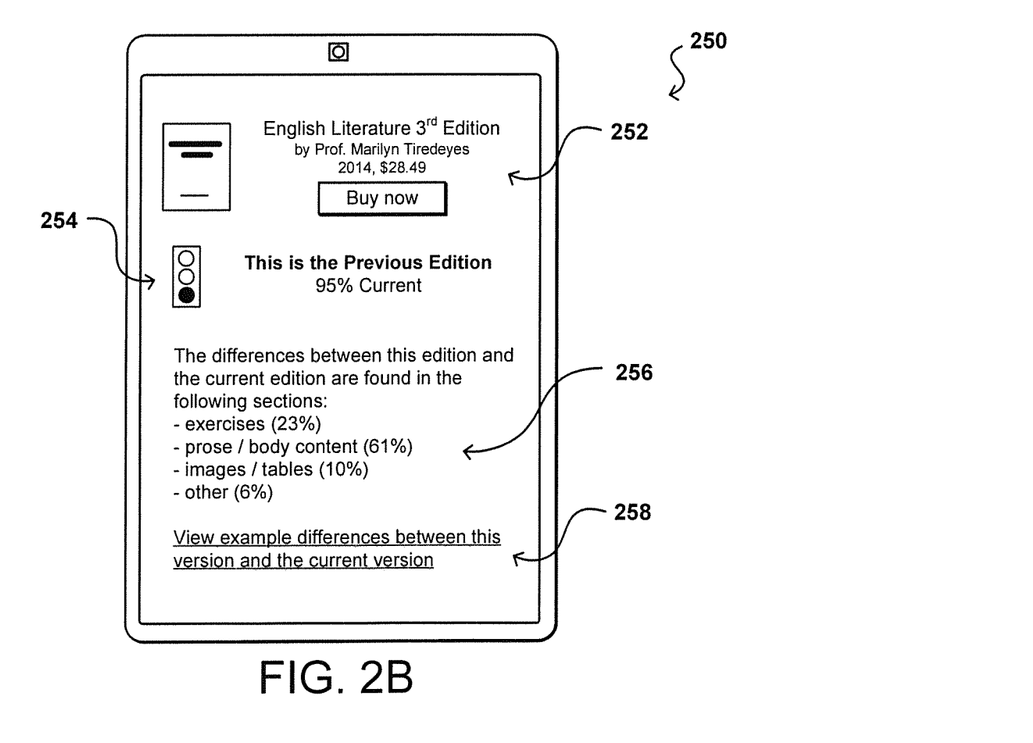

Similar information can be provided when a page of information is being displayed for a single book or object, such as is displayed in the example 250 of FIG. 2B. In this example, similar basic information 252 is displayed regarding the title, author, and the like. The individual page can also include information 254 about the particular edition, here again presenting the difference from the current version, information about the difference, etc. In some embodiments, the information displayed can include contextual information 256 as well, which can better enable a potential consumer to determine whether to buy this edition or a different edition. In this example the information includes a breakdown of the types of changes that were located between the two editions. In this case, the example breaks down changes that were found in the exercises, the prose or body content, in the images or tables, and other miscellaneous changes, such as to the title or cover, etc. The information also breaks down the relative percentages of these changes, such that the user can better understand the nature of the changes and how much the changes might impact the usefulness of the particular edition. In this example, the display also includes a link 258, although other mechanisms can be used as well, to cause additional information about the differences to be displayed. In this case, the link provides an option to display some or all of the differences located between the versions. In some embodiments all differences may be able to be viewed, while in other embodiments certain samples or portions may be able to be displayed as may be determined by various contract provisions, fair use, the extent of the changes, or other such factors.

FIGS. 3A and 3B illustrate example ways in which the differences can be presented to a user in accordance with various embodiments. In the example display 300 of FIG. 3A, a side-by-side comparison of pages of the books 302, 304 is displayed such that the user can actually determine the differences between the editions. In this example the detected changes are highlighted in order to enable the user to more easily locate and determine the differences. In some embodiments the detected differences can have tags or other elements enabling a user to cycle through the changes, in order to more quickly determine the types of changes and the extent to which those changes affect the usefulness of each edition. FIG. 3B illustrates another example display that can be presented to a user in accordance with various embodiments. In this example, the changes are listed out for the user, with the changed content visible to the user. This can also quickly enable a potential consumer to view the type and extent of the changes in order to determine, for example, whether the cost savings of buying an earlier edition is worth the changes between editions, etc. In some embodiments the listed changes can be linked to the individual pages for comparison. In still other embodiments the list can be sorted or filtered to display certain types of changes, such as to view all the changes to the exercises or prose. For example, a consumer might be able to filter so as to be able to view all of the changes to the exercises in one place, in order to determine whether the consumer thinks he or she can be successful in a class that utilizes the current edition, or whether the extent is such that the consumer might be able to obtain that information from a classmate or other such source.

Figure 4:
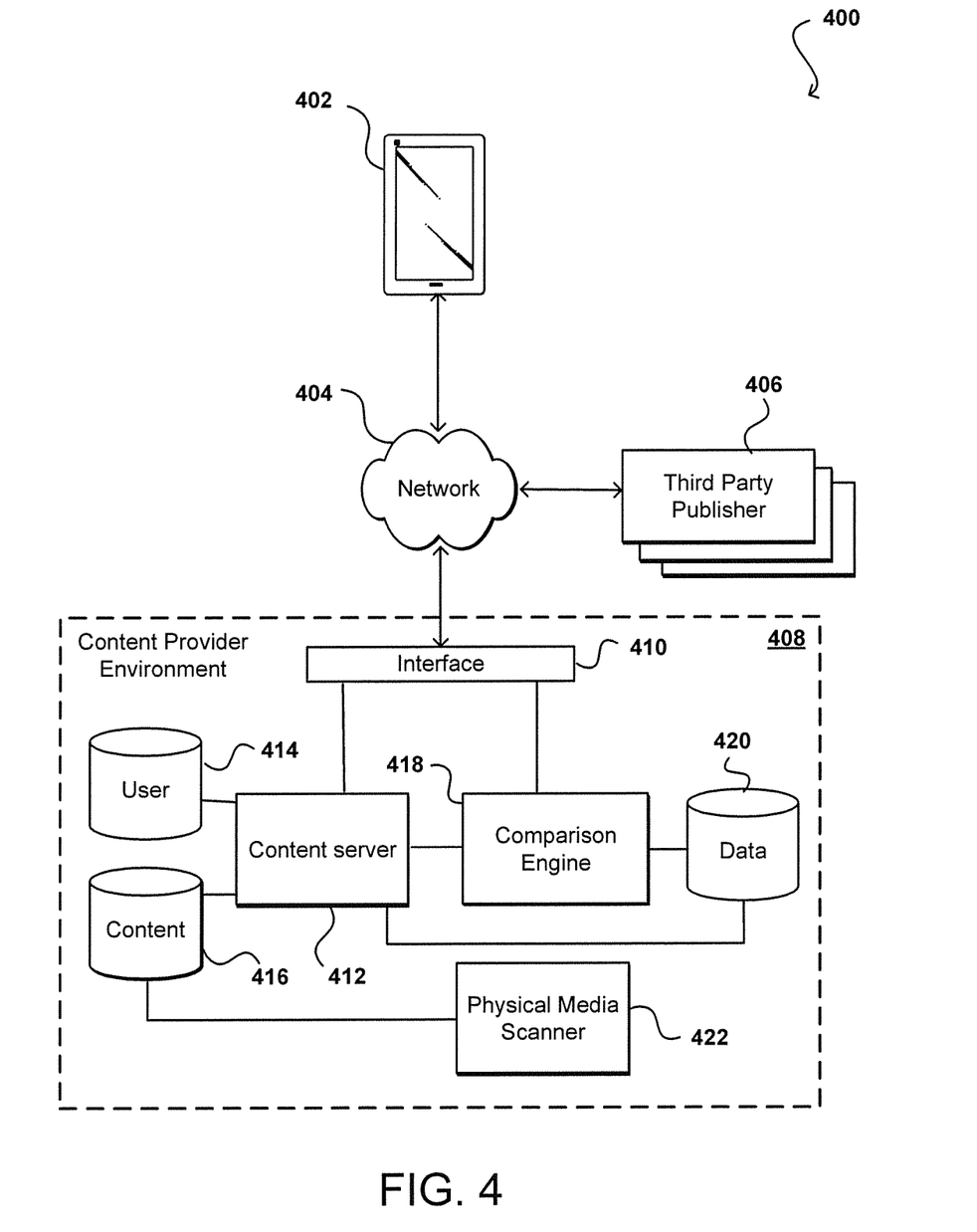
FIG. 4 illustrates an example environment that can be used to implement aspects of the various embodiments.

FIG. 4 illustrates an example of an environment 400 that can be used to determine and/or surface information about differences between versions or editions that can be utilized in accordance with various embodiments. In this example, a client computing device 402 can submit a request for content across at least one network 404 to be received by a content provider environment 408. This can include, for example, a request from a potential consumer wanting to obtain information about a version or edition of an item, such as a physical book or e-book, among other types of devices.

In this example, a request received to the resource provider environment 408 can be received by an interface layer 410 of the environment. As known for network environments, the interface layer can include components such as interfaces (e.g., APIs), load balancers, request and/or data routers, and the like. If the request is a request for content, such as for information about an object to be displayed in an application or Web browser, for example, information for the request can be directed to one or more content servers 412, which can obtain the content from a content data store 416 or other such repository to be sent back across the network(s) to the computing device 402. In some embodiments, information for the request might also be compared against user data in a user data store 414 or other such location to determine, for example, whether the user has access rights to that content. In one example, a consumer might need an account with the content provider in order to obtain some or all of the content for the request, such as to obtain a view of a portion of an e-book that the consumer has not yet purchased.

In at least some embodiments, content for the request can be receive from various third party publishers 406. This can include, for example, receiving electronic book content from the publisher systems or receiving digital information for physical books or items offered by the publishers, among other such options. The interface layer can determine the type of call or request, and cause information to be forwarded to the appropriate component or location. In this example, the content can be stored to a content data store 416, for example, that is accessible by the content sever 412 in order to serve the appropriate content for the requests. This example also includes a physical media scanner 422, such as a workstation that is capable of receiving a physical book, magazine, periodical, or other such text, and scan in at least a portion of the content. That content can then be analyzed using various components, such as an OCR engine and image recognition software, in order to attempt to determine the content of the text, which can also be stored to the content data store 416 or a separate data store 420 for analysis, among other such options.

The provider environment 408 can also include a component, system, or service such as a comparison engine 418 that can analyze content for two or more editions of a text or other piece of content and attempt to determine the differences between those editions. As discussed, the comparison engine (or another component, device, or service) can also attempt to quantify the differences, as well as to attempt to determine contextual information for some or all of the differences. The comparison can be done offline in many instances, while in other instances the comparison of at least a portion of the versions may be done in real time or in response to a consumer request, among other such options. For example, a user might be able to flip through page-by-page comparisons, and the comparison engine can be tasked with determining the changes displayed for each page and providing some type of display for those changes. In some embodiments the difference information, once determined, can be stored with content for the editions in the content data store 416, such that the difference information can be displayed with content for the texts as provided by the content server 412 or another such component. It should be noted that at least some of the components, such as the comparison engine and physical media scanner, can be provided as a service from outside the provider environment and/or by a third party in at least some embodiments.

Figure 5:
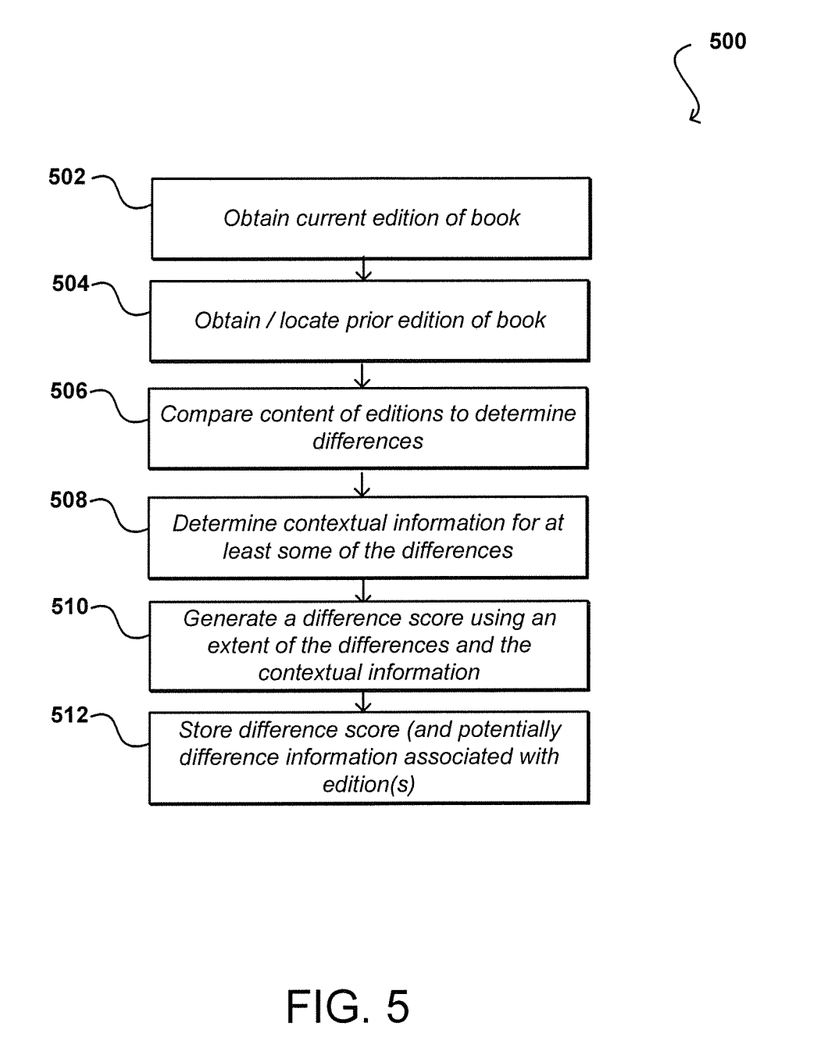
FIG. 5 illustrates an example process for determining differences between editions that can be utilized in accordance with various embodiments.

FIG. 5 illustrates an example process 500 for determining difference information for different editions of the same book (or other instance of content) that can be utilized in accordance with various embodiments. It should be understood that, for this and other processes discussed herein, there can be additional, fewer, or alternative steps, performed in similar or alternative steps, or in parallel, within the scope of the various embodiments unless otherwise stated. In this example, digital content is obtained 502 for a current edition of a book, such as a textbook. As mentioned, the digital content can be obtained by various mechanisms, such as by receiving the digital content from a publisher or scanning in the content from a physical copy, among other such options. If a digital copy is received, the digital copy may include metadata identifying types of portions of the book and/or providing contextual information. The scanning process can also involve various processes, such as optical character recognition, image recognition, and the like, which can be used to attempt to analyze the content, determine types of different portions of the content, classify portions of the content, etc. Digital content can also be obtained 504 for a prior edition of the book, using similar approaches. While this example compares two editions, it should be understood that multiple editions can be compared using such a process in accordance with various embodiments.

Once the digital content is obtained for both editions the content of both editions can be compared 506 to locate differences between the two editions. This can include, for example, text matching, image matching, document comparison, and the like, using any of a number of approaches known or used to compare two instances of digital content. Further, the process can involve attempting to determine 508 contextual information for at least some of the differences. This can include, for example, determining a type of content (i.e., a title, body text, exercise, or table) where the difference is located, as well as a type of change (i.e., substantive, formality, insignificant, etc.). The difference information, along with the contextual information for the differences, can be used to generate 510 a difference score for the two editions. A score can be generated using other information as well, such as previously submitted user reviews, differences in source code for electronic versions of the books, and the like. In some embodiments, this can include a straightforward percentage difference where the overall number of characters or words, for example, is compared and the score is the percentage of those words that is similar (or that is different) between the editions, where "similar" can be defined by the process but generally involves a similar type of content with similar phrasing in similar locations in the book. In some embodiments, only portions of the book that are determined to be significant or substantive may be included in such a determination. Thus, changes to reviews, forwards, chapter titles, and the like may not be included in the determination, but changes to the body prose, exercises, and examples may be included in the determination. In some embodiments a score is generated that can be similar to the percentage similarity, for example, but where different types of differences are given different weightings. This can include, for example, a change to a word in an exercise counting two times or more as much to the score as a change to a single word in the body of the text, unless contextual information dictates otherwise. As mentioned, in some embodiments multiple scores can be generated, such as an overall score for the editions and a separate score for the exercises, body text, and/or other such portions. As mentioned, the weighting can also update over time based upon factors such as user interaction, content returns, user reviews, and the like. Information for the differences can then be stored 512 and associated with the editions. The information can include, for example, the actual differences, locations of the differences, types of differences, difference scores, and the like.

Figure 6:
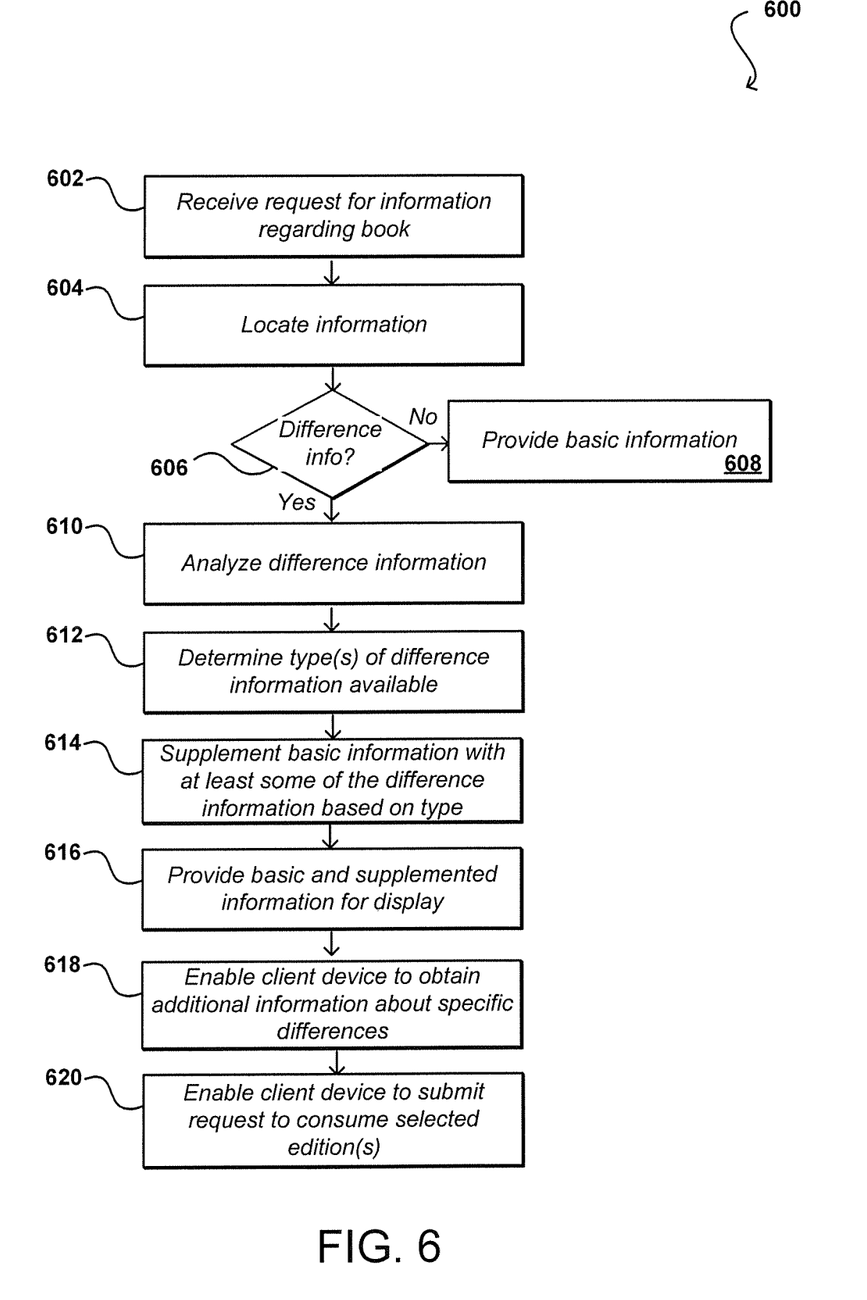
FIG. 6 illustrates an example process for providing information regarding differences between editions that can be utilized in accordance with various embodiments.

FIG. 6 illustrates an example process 600 for surfacing difference information to a potential consumer that can be utilized in accordance with various embodiments. In this example, a request for edition content is received 602 from a client device, where the edition content can include content for a current edition of a book (or other type of content), a previous edition of a book, a comparison of the two editions, a set of search results including those editions, or other such content. The content for the request can be located 604 from one or more appropriate data stores. Along with the content, a determination can be made 606 as to whether difference information is available. If not, the content for the request can be provided 608 for display on the client device. If difference information is available, the difference information can be analyzed 610 and the type of difference information determined 612. This can include, for example, whether the difference information is a difference score, set of scores, includes contextual information, includes links to instances of the difference, enables a side by side comparison, etc. Based at least in part upon the type of differences, the content to be provided can be updated or supplemented 614 using the difference information, with the type and format of the additional content based at least in part upon the type and amount of difference information available. Once the content is updated or supplemented as appropriate, the content can be provided 616 for display on the client device. The client device can then be enabled 618 to obtain additional information about the differences, such as by a request for additional information being received from the client device. This can include, for example, a request to view the actual differences or any additional information about the differences. The client device can also be enabled 620 to provide a consumption option to a user of the device, such as to purchase, rent, borrow, or download at least one of the editions.

Figure 7:
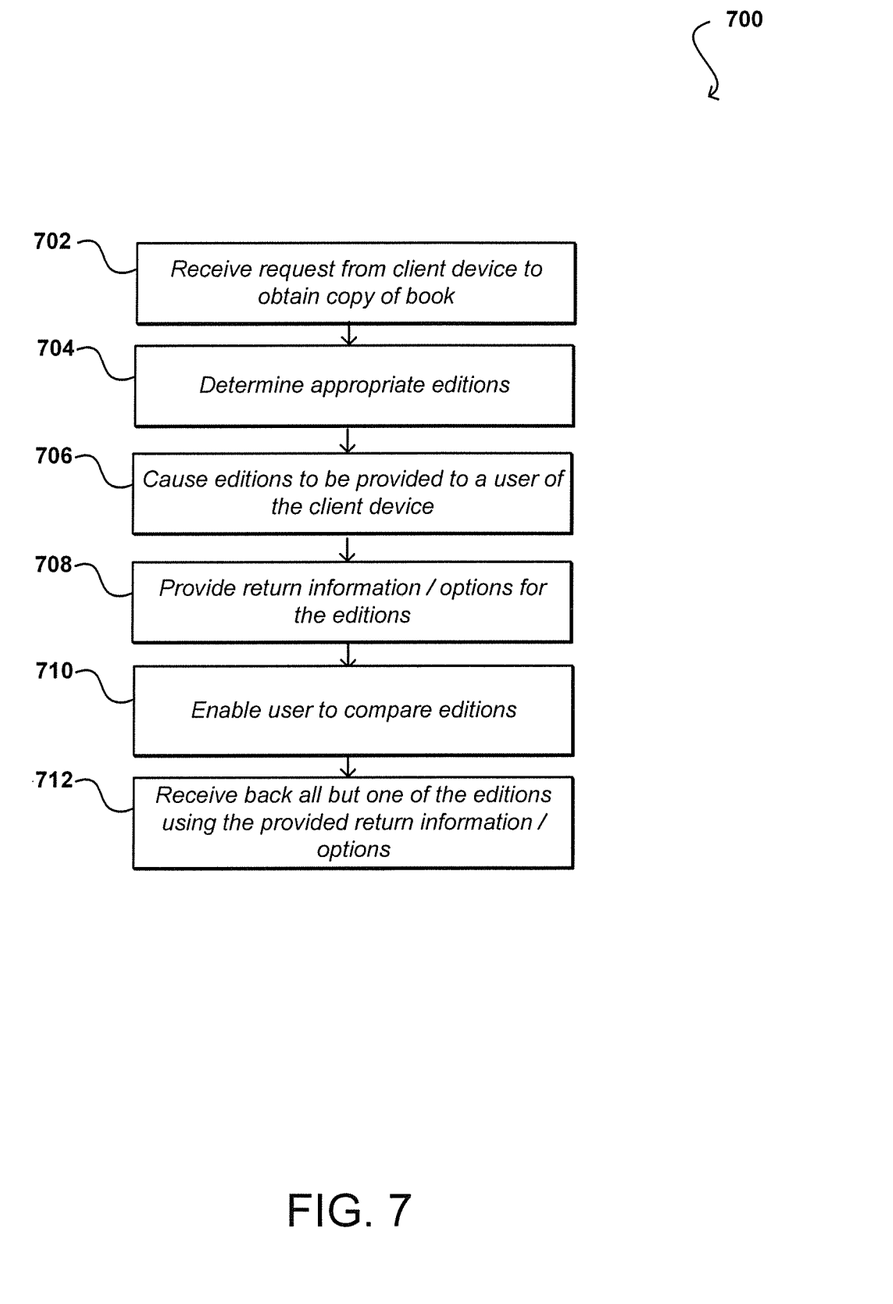
FIG. 7 illustrates an example process for providing customers with multiple versions of specified content that can be utilized in accordance with various embodiments.

FIG. 7 illustrates an example process 700 for an alternative approach to enabling a consumer to compare editions of a book or other type of object. In this example, a request is received 702 from a client device to provide copies of the book. In response, the editions of the books can be determined and located 704 and provided 706 to the user, such as by shipping two or more physical copies to the user, where each copy is a different edition. Along with the physical copies, return information 708 can be provided to the user as well. These can be physical return labels included in the packaging, for example, or digital options downloadable or otherwise obtainable by the user. The user is then enabled 710 to compare the editions and determine the edition that the user wants to keep, and the unwanted books can be received back 712 from the user using the return information. Such an approach enables the user to compare the differences, but also enables the user to determine the condition of each physical copy, such as whether people have written in the books, whether the books are torn or worn, etc. There may be an additional charge for such a service, but such an option can enable the user to determine whether a cheaper but older edition is acceptable, which can save the user money over time. Further, such a process can save the user the time and hassle of purchasing multiple editions and having to manually set up returns of one or more editions, which might take a length of time that might not be optical for users such as students who are currently enrolled in a class utilizing the book. In some embodiments, the user may be able to obtain a digital copy of the first chapter or two of the book while the book is in shipment, in order to enable the user to not fall behind in a class or book club, etc.

Another advantage of such an approach is that it can improve the performance of a computer system and/or a shipping system, among other such advantages. For example, enabling a user to quickly and easily view difference information can reduce the amount of time and effort the user has to do research for the items, which can reduce the amount of resources and bandwidth required for the user session. Further, the providing of valuable difference information can reduce the number of returns and/or new orders, which can reduce the amount of shipping needed, overhead for returns, overhead for redundant orders, etc. Various other advantages and savings would be experienced as well as would be obvious to one or ordinary skill in the art in light of the teachings and suggestions contained herein.

Figure 8:
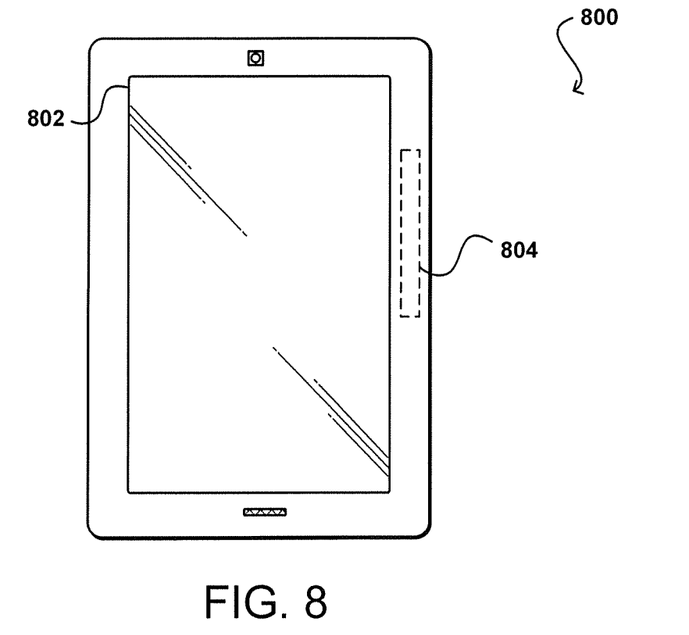
FIG. 8 illustrates an example computing device that can be utilized in accordance with various embodiments.

FIG. 8 illustrates an example computing device 800 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

Figure 9:
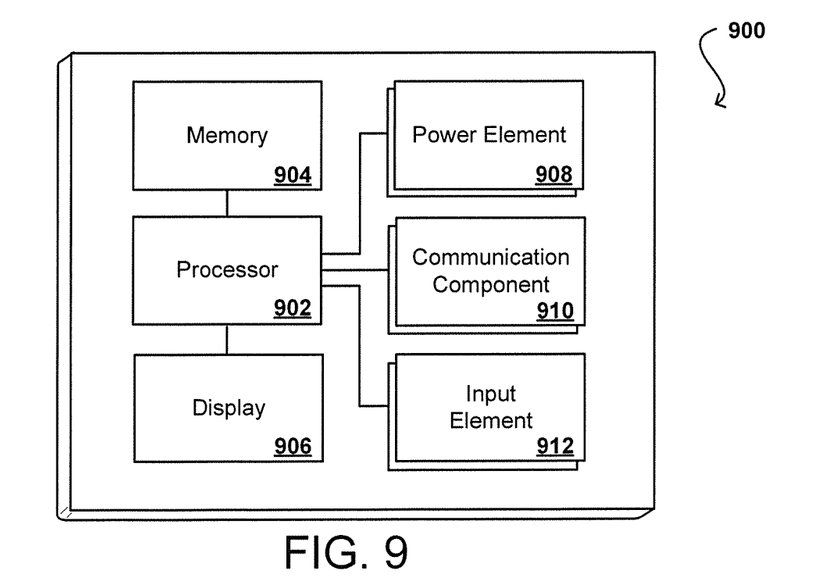
FIG. 9 illustrates an example configuration of components of a computing device, such as the device illustrated in FIG. 8.

In this example, the computing device 800 has a display screen 802 that, under normal operation, will display information to a user (or viewer) facing the display screen (e.g., on the same side of the computing device as the display screen). As discussed herein, the device can include one or more communication components 804, such as may include a cellular communications subsystem, Wi-Fi communications subsystem, BLUETOOTH® communication subsystem, and the like. FIG. 9 illustrates a set of basic components of a computing device 900 such as the device 800 described with respect to FIG. 8. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device typically will include at least one type of display element 906, such as a touch screen, electronic ink (e-ink), organic light emitting diode (OLED) or liquid crystal display (LCD), although devices such as portable media players might convey information via other means, such as through audio speakers. The device will also include one or more power elements 908 or sources, such as rechargeable batteries, battery compartments, wired or wireless power adapters, and the like. The device can include at least one communication component 910, as may enabled wired and/or wireless communication of voice and/or data signals, for example, over a network such as the Internet, a cellular network, a Wi-Fi network, BLUETOOTH®, and the like. The device can include at least one additional input device 912 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
under the control of one or more computer systems configured with executable instructions,
obtaining current digital content for a current edition of a book;
comparing, using one or more processors of the one or more computer systems, prior digital content for a prior edition of the book to the current digital content for the current edition of the book to locate a plurality of differences between the current digital content and the prior digital content, the prior edition including a first iteration of the book and the current edition including a second iteration of the book, the second iteration of the book succeeding the first iteration of the book, and wherein comparing the prior digital content to the current digital content comprises comparing text of the prior digital content to text of the current digital content to identify a plurality of differences between the text of the prior digital content and the text of the current digital content;
determining contextual information including determining types of differences for at least a subset of the plurality of differences between the current digital content and the prior digital content;
generating, using the one or more processors, a difference score with respect to the current edition and the prior edition based at least upon the determined types of differences, at least one review of the current edition, and the plurality of differences between the text of the prior digital content and the text of the current digital content, the difference score representing an extent of the differences of the subset of the plurality of differences as determined using the contextual information;
receiving a request for edition consumption information regarding at least one of the current edition and the prior edition;
providing for display the edition consumption information along with the difference score, wherein the difference score comprises an indication of whether to obtain the prior edition of the book or the current edition of the book; and
providing navigational elements enabling at least a portion of the differences between the current edition and the prior edition to be displayed on a remote client device receiving the edition consumption information.

2. The computer-implemented method of claim 1, wherein determining the contextual information includes determining, for differences of the subset of the plurality of differences, at least one of a location or an extent of the differences.

3. The computer-implemented method of claim 2, further comprising:
providing, along with the edition consumption information and the difference score, at least one option enabling a display of at least one of a portion of the contextual information or the plurality of differences between the prior edition of the book and the current edition of the book.

4. The computer-implemented method of claim 1, further comprising:
determining a second difference score with respect to the current edition and a second prior edition; and
providing the second difference score for display with the edition consumption information.

5. A computer-implemented method, comprising:
under the control of one or more computer systems configured with executable instructions,
obtaining digital content for a current edition of a media object and digital content for a prior edition of the media object, the prior edition including a first iteration of the media object and the current edition including a second iteration of the media object, the second iteration of the media object succeeding the first iteration of the media object;
analyzing, using one or more processors of the one or more computer systems, the digital content for the current edition of the media object and the digital content for the prior edition of the media object to determine differences between the current edition and the prior edition, wherein analyzing the digital content for the current edition and the digital content for the prior edition comprises analyzing text of the current edition and text of the prior edition to identify differences between the text of the current edition and the text of the prior edition;
determining, using the one or more processors, contextual information including determining types of differences for at least a subset of the plurality of differences between the current edition and the prior edition;
generating, using the one or more processors, a difference score with respect to the current edition and the prior edition based at least upon the determined types of differences and at least one review of the media object, the difference score representing an extent of the differences of the subset of the plurality of differences as determined using the contextual information;
receiving a request for edition consumption information regarding at least one of the current edition and the prior edition;
providing, for display, edition difference information along with the consumption information for the request, the edition difference information generated using the determined differences between the current edition and the prior edition; and
providing navigational elements enabling at least a portion of the differences between the current edition and the prior edition to be displayed on a remote client device receiving the edition difference information.

6. The computer-implemented method of claim 5, further comprising:
determining the edition difference information at least in part by determining a percentage of the digital content for the current edition that is different from the digital content for the prior edition.

7. The computer-implemented method of claim 6, further comprising:
determining a type of difference for each determined difference of the edition difference information, wherein only differences of at least one specified difference type are considered for the percentage of the digital content for the current edition that is different from the digital content for the prior edition.

8. The computer-implemented method of claim 7, further comprising:
determining the type of difference at least in part by analyzing metatags included in the digital content for the current edition or the digital content for the prior edition.

9. The computer-implemented method of claim 6, further comprising:
determining respective weightings of the determined differences based at least in part upon the contextual information, the respective weightings indicating a relative significance of a respective difference.

10. The computer-implemented method of claim 9, further comprising:
generating new weightings over time for the different types of differences based at least in part upon at least one of user feedback or user interaction with content having determined edition difference information.

11. The computer-implemented method of claim 5, further comprising:
scanning in pages of at least one of the current edition or the prior edition to obtain at least a portion of the digital content for the current edition or the digital content for the prior edition, the scanning including at least one of performing an optical character recognition or an image recognition.

12. The computer-implemented method of claim 5, further comprising:
causing both the current edition and the prior edition to be shipped to an address associated with the request; and
providing a return option enabling a return of either the current edition or the prior edition.

13. The computer-implemented method of claim 5, further comprising:
determining, based at least in part upon the determined differences between the current edition and the prior edition, whether the extent of the differences falls above or below a determined difference threshold;
providing for display a first graphic if the extent of the differences falls above the determined difference threshold; and
providing for display a second graphic if the extent of the differences falls below the determined difference threshold, wherein the first graphic indicates that the prior edition is substantially similar to the current edition and the second graphic indicates that the prior edition is substantially different from the current edition.

14. A system, comprising:
at least one processor; and
memory storing instructions that, when executed by the at least one processor, cause the system to:
obtain digital content for a current edition of a media object and digital content for a prior edition of the media object, the prior edition including a first iteration of the media object and the current edition including a second iteration of the media object, the second iteration of the media object succeeding the first iteration of the media object;
analyze the digital content for the current edition of the media object and the digital content for the prior edition of the media object to determine differences between the current edition and the prior edition, wherein analyzing the digital content for the current edition and the digital content for the prior edition comprises analyzing text of the current edition and text of the prior edition to identify the differences between the text of the current edition and the text of the prior edition;
determine contextual information including determine types of differences for at least a subset of the plurality of differences between the current edition and the prior edition;
generate a difference score with respect to the current edition and the prior edition based at least upon the determined types of differences and at least one review of the media object, the difference score representing an extent of the differences of the subset of the plurality of differences as determined using the contextual information;
receive a request for edition consumption information regarding at least one of the current edition and the prior edition;
provide, for display, edition difference information along with the consumption information for the request, the edition difference information generated using the determined differences between the current edition and the prior edition; and
provide navigational elements enabling at least a portion of the differences between the current edition and the prior edition to be displayed on a remote client device receiving the edition difference information.

15. The system of claim 14, wherein the instructions when executed cause the system to:
determine the edition difference information at least in part by determining a percentage of the of the digital content for the current edition that is different from the digital content for the prior edition.

16. The system of claim 15, wherein the instructions when executed cause the system to:
determine a type of difference for each determined difference of the edition difference information, wherein only differences of at least one specified difference type are considered for the percentage of the digital content for the current edition that is different from the digital content for the prior edition.

17. The system of claim 15, wherein the instructions when executed cause the system to:
determine respective weightings of the determined differences based at least in part upon the contextual information, the respective weightings indicating a relative significance of a respective difference.

* * * * *